(12) United States Patent
Scheuneman et al.

(10) Patent No.: US 6,620,025 B2
(45) Date of Patent: Sep. 16, 2003

(54) EVAPORATOR FOR THE TREATMENT OF HONEY BEE DISEASES AND UNDESIRABLE HIVE CONDITIONS

(76) Inventors: Theodore W. Scheuneman, 780 Willis Road, West St. Paul, Manitoba (CA), R4A 4A3; Ronald Paul Rudiak, Box 1448, Steinbach Manitoba (CA), R0A 2A0

( * ) Notice: Subject to any disclaimer, the term of this patent is extended or adjusted under 35 U.S.C. 154(b) by 139 days.

(21) Appl. No.: 09/832,984

(22) Filed: Apr. 12, 2001

(65) Prior Publication Data

US 2002/0151249 A1 Oct. 17, 2002

(51) Int. Cl.[7] .......................... A01K 51/00; A01K 47/00
(52) U.S. Cl. .................. 449/2; 449/1; 449/12
(58) Field of Search .................. 449/1, 2, 12

(56) References Cited

U.S. PATENT DOCUMENTS

| | | |
|---|---|---|
| 4,867,731 A | 9/1989 | Willard et al. |
| 4,876,265 A | 10/1989 | Schmid ................ 514/370 |
| 5,069,651 A | 12/1991 | Arndt ................... 449/2 |
| 5,162,014 A | 11/1992 | Moore et al. .......... 449/2 |
| 6,037,374 A | 3/2000 | Kochansky et al. ...... 514/557 |
| 6,096,350 A * | 8/2000 | Kemp et al. ........... 449/1 |
| 6,285,829 B1 * | 9/2001 | Smith ................. 392/390 |

FOREIGN PATENT DOCUMENTS

DE          3308017 C1 *  3/1984  .......... 449/12

* cited by examiner

Primary Examiner—Charles T. Jordan
Assistant Examiner—Elizabeth Shaw

(57) ABSTRACT

An evaporator which provides formic acid vapour at a consistent and repeatable rate for effective treatment of varroatosis in honey bees. The evaporation chamber is heated by an electrical element(s) and maintained at a constant temperature by a mechanical thermostat or electronic control circuit. The amount of vaporised material is controlled by adjusting the temperature setting and metering apertures of the evaporation chamber. A continuous flow of formic acid vapour has been demonstrated to kill tracheal and varroa mites much more effectively than other methods and systems, now in use, which depend primarily on the amount of heat generated within the hive as well as solar radiation and ambient temperatures for their operation. The evaporator is made using materials which are largely unaffected by corrosive chemicals, such as formic acid. All electrical components are protected from moisture and corrosion with a protective coating.

17 Claims, 2 Drawing Sheets

EVAPORATOR FOR THE TREATMENT OF HONEY BEE DISEASES AND UNDESIRABLE HIVE CONDITIONS

BACKGROUND OF THE INVENTION

Damage to bee colonies resulting from epidemic diseases caused by mites has become a serious threat to bee stocks throughout the world. Aside from leading to decreases in honey production, the spread of these mites also pose a threat to any form of agriculture which relies on honey bee pollination.

U.S. Pat. No. 4,867,731 teaches a method for the detection of infestation of bees with mites comprising placing a replaceable insert with an upwardly facing adhesive trapping surface with a spaced screen mounted thereover into a hive, wherein the spaces in the screen are large enough for mites to pass through (and onto the adhesive surface) but too small for the bees to pass through. The inventors note that this method can also be used in combination with treatments for evaluating the effectiveness of various miticides or in combination with irritants, such as Fluvalinate strips or tobacco or dry grass smoke.

However, when treating honey bees with fluvalinate strips, up to 60 percent of the varroa mites, which fall onto the observation material placed below the colony, are alive. It has been observed that these still-viable mites can survive without food for up to 7 days. During this time period, mites which fall from the bees are able to re-attach themselves to honey bees and re-infect the hive. Because not all of the mites are killed quickly when fluvalinate strips are used, but continue to remain viable for up to 7 days, 20–30% of these mites become re-introduced into the honey bee colony, and may hasten the development of fluvalinate resistance. Furthermore, fluvalinate is known to irreversibly contaminate all hive products including wax and honey. It has also been demonstrated that low residual levels of pesticides can contribute to mite resistance.

U.S. Pat. No. 4,876,265 teaches a process for controlling mites on honey bees using 2-(2,4-dimethyl-phenylimino)-3-methylthiazoline or derivatives thereof as the active ingredient. The composition is applied to fumigant strips or prepared as a concentrate. In use, the compositions are either fed to the bees or arranged to drip onto the bees.

U.S. Pat. No. 5,069,651 teaches a method and device for removing parasites from bees which comprises forcing heated air into a hive such that the temperature within the hive is elevated to a temperature that is not tolerated by the mites but is tolerated by the bees. Specifically, the air within the hive is heated to 120–130° F. for approximately 15 minutes. In some embodiments, vegetable oil is sprayed into the flow of heated air. The device is fitted on top of the bee hive and includes a thermostat for monitoring air temperature.

U.S. Pat. No. 5,162,014 teaches a method for treating honey bees infected with mites comprising exposing the hive to a magnetic field which is greater than two orders of magnitude stronger than the magnetic field of the earth.

Formic acid has previously been used in liquid form to control mites in honey bees (apis mellifera). Formic acid is known as a desiccating material, and has been widely used, by various methods, to control mites within honey bee colonies. Scientific analysis confirms that a minute amount of formic acid will occur in pure honey. Apis cerana is another strain of bee and the natural host for varroa mites. Varroa has always been exposed to low levels of formic acid in the honey of apis cerana making it unlikely that these mites will become resistant to this material in the future. In one instance, a cardboard-like material soaked with formic acid and arranged to be inserted into a hive was developed. Others have used cheesecloth soaked with formic acid, containers with wicks, and formic acid in a gel. For example, U.S. Pat. No. 6,037,374 teaches gel compositions of formic acid and a gelling agent. The gel is used in various types of dispensers which allow emission of formic acid vapor. Alternatively, they note that the gel may be applied directly, for example, with a caulking gun. However, it is of note that while formic acid vapor is emitted during the warmer parts of the day, but levels of formic acid vapor dropped during cooler evening hours using the gel compositions, meaning that the formic acid vapor is not continuously applied in this method.

As will be appreciated by one knowledgeable in the art, application of varying levels of formic acid vapors over a long period of time may be less effective at killing the mites while being detrimental to the honey bees' health. Clearly, an improved method for treating honey bees infected with mites is needed.

SUMMARY OF THE INVENTION

According to a first aspect of the invention, there is provided a method of treating honey bee diseases comprising:

provided a substantially air-tight reservoir containing a volatile material, said reservoir having at least one opening therein;

placing the reservoir in contact with a bee hive; and heating the volatile material in the reservoir such that a vapor is produced from the volatile material, said vapor exiting the reservoir and entering the bee hive via said opening, said vapor having miticidal properties.

The opening may be metered for controlling the amount of vapor entering the hive.

The volatile material may be formic acid.

The reservoir may include a heater for heating the volatile material.

The heater may include a control unit for regulating the heater.

The reservoir may be placed in a bee hive.

According to a second aspect of the invention, there is provided a device comprising:

a reservoir for storing a quantity of a volatile material;

a heater for heating the volatile material; and a control unit for regulating the heater.

The reservoir may be substantially air-tight and the reservoir includes at least one opening.

The opening may be metered.

The volatile material may be formic acid.

One embodiment of the invention will now be described in conjunction with the accompanying drawings in which:

BRIEF DESCRIPTION OF THE DRAWINGS

In the drawings like characters of reference indicate corresponding parts in the different figures.

DESCRIPTION OF THE PREFERRED EMBODIMENTS

Figure 1:
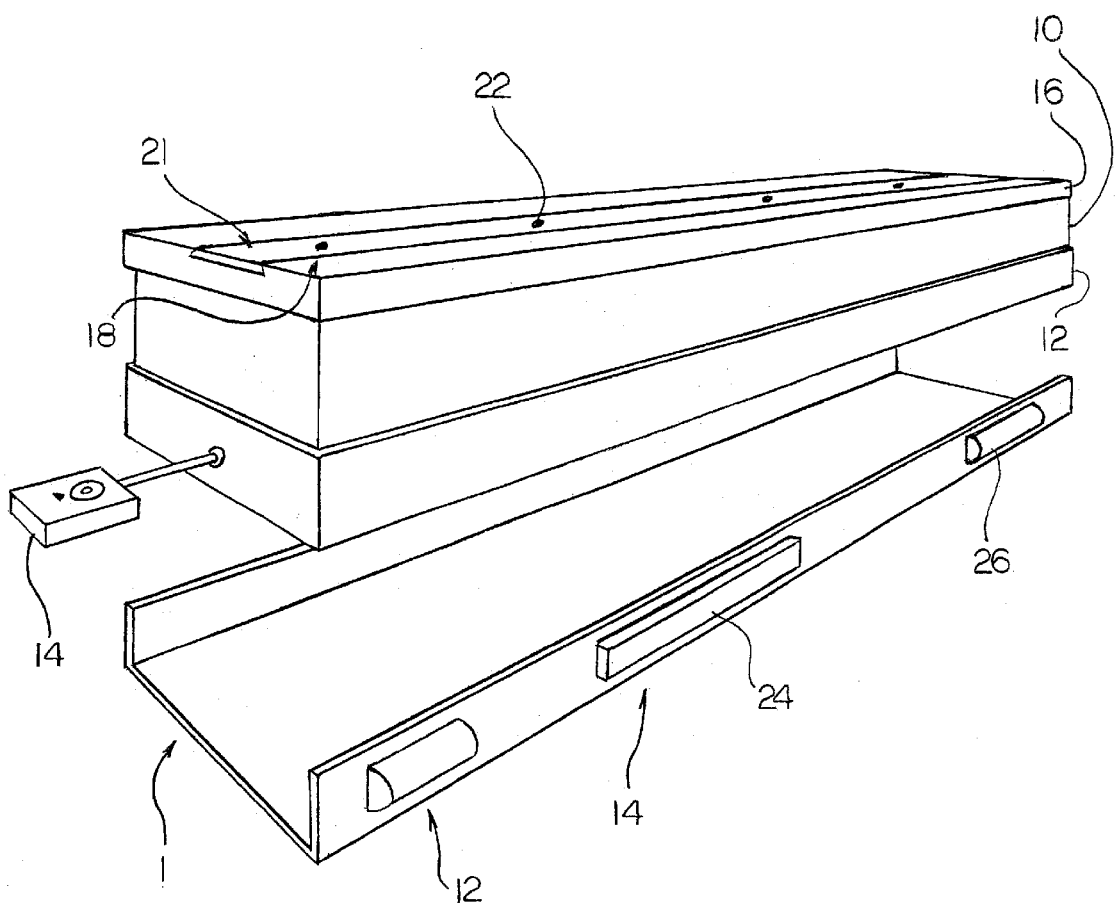
FIG. 1 is an exploded view of one embodiment of the evaporator.

Described herein is an evaporator that is designed for effectively applying volatile materials for treating honey bee diseases and/or abnormal hive conditions. Examples of these known in the in art include, but are by no means limited to, for example, varroa mites, tracheal mites, nosema disease and chalkbrood. Specifically, the evaporator comprises a reservoir for storing the volatile material, for example, formic acid, which is heated so that vapor is released into the bee hive. The amount of vapor released is metered so that the formic acid levels introduced into the hive are not harmful to the bees but lethal to the mites.

Referring to the drawings, an evaporator 1 comprises an evaporation chamber 10, a heat source 12 and a control unit 14.

The evaporation chamber 10 is arranged to hold a quantity of a volatile material, for example, formic acid, as described below. As will be appreciated by one knowledgeable in the art, the evaporation chamber 10 may be composed of any suitably resistant material such that the evaporation chamber 10 is not corroded by the volatile material. In some embodiments, the evaporation chamber 10 is composed of steel or a formic-acid-resistant plastic.

The evaporation chamber 10 includes a top 16 which is arranged to fit securely and tightly onto the evaporation chamber 10. The top 16 includes at least one opening for exit of vapor into the hive. In one embodiment, the top 16 is equipped with adjustable metering holes 18 to allow escape of the liquid from the container as it vaporises. As will be appreciated by one knowledgeable in the art, other means for regulating the flow of vapor from the evaporation chamber 10 into the hive may also be utilized. In some embodiments, the evaporation chamber 10 further includes an absorbent material 20 onto which the volatile material is loaded, as described below.

The heat source 12 provides controlled heat directly to the evaporation chamber 10. As a result of this arrangement, in use a small amount of heat circulates upward which increases the temperature within the bee hive. The heat source 12 may comprise an electrical element or a small diameter tube, as described below. As will be appreciated by one knowledgeable in the art, in this embodiment, temperature controlled liquid circulated continuously through the tubing provides heat for the evaporation chamber 10.

The control unit 14 is used to regulate the temperature of the heat source unit and, therefore, the temperature of the evaporation chamber 10. In some embodiments, the control unit 14 comprises a mechanical thermostat or electronic control circuit which is used to control the temperature of the heat source 12, as described below. As will be appreciated by one knowledgeable in the art, a fully electronic system is more reliable and accurate than a mechanical thermostat, although any suitable control unit known in the art may be used with the evaporator 1.

The evaporator 1 shown in FIG. 1, in its operation, vaporises material, for example, formic acid, placed inside the corrosion-resistant evaporation chamber 10 which is covered with the top 16. As described above, the tight-fitting top 16 is equipped with metering holes 18 with openings adjusted by a slide 21. Specifically, the slide 21 includes a plurality of holes 22 which are arranged to be aligned with the metering holes 18. The slide 21 is slidably mounted onto the top 16 such that the holes 22 can be aligned or misaligned with the metering holes 18. In this manner, the amount of vapor released into the hive is controlled by the degree of alignment between the metering holes 18 and the holes 22. In the embodiment shown in FIG. 1, the evaporation chamber 10 has an inside volume of 500 cc, adequate for treating several honey bee colonies for mites with formic acid without refilling. In this embodiment, the heat source 12 comprises 2 fifteen watt heating elements 26, for a total of 30 watts of available heating capacity, and the control unit 14 is an electronic thermostat 24 which regulates the temperature of the unit. As will be appreciated by one knowledgeable in the art, other suitable wattages and arrangements may also be used. In this embodiment, the main body of the heat source 12 is constructed of heavy aluminium sheet metal to distribute heat from the heating elements 26 evenly over the entire surface.

Figure 2:
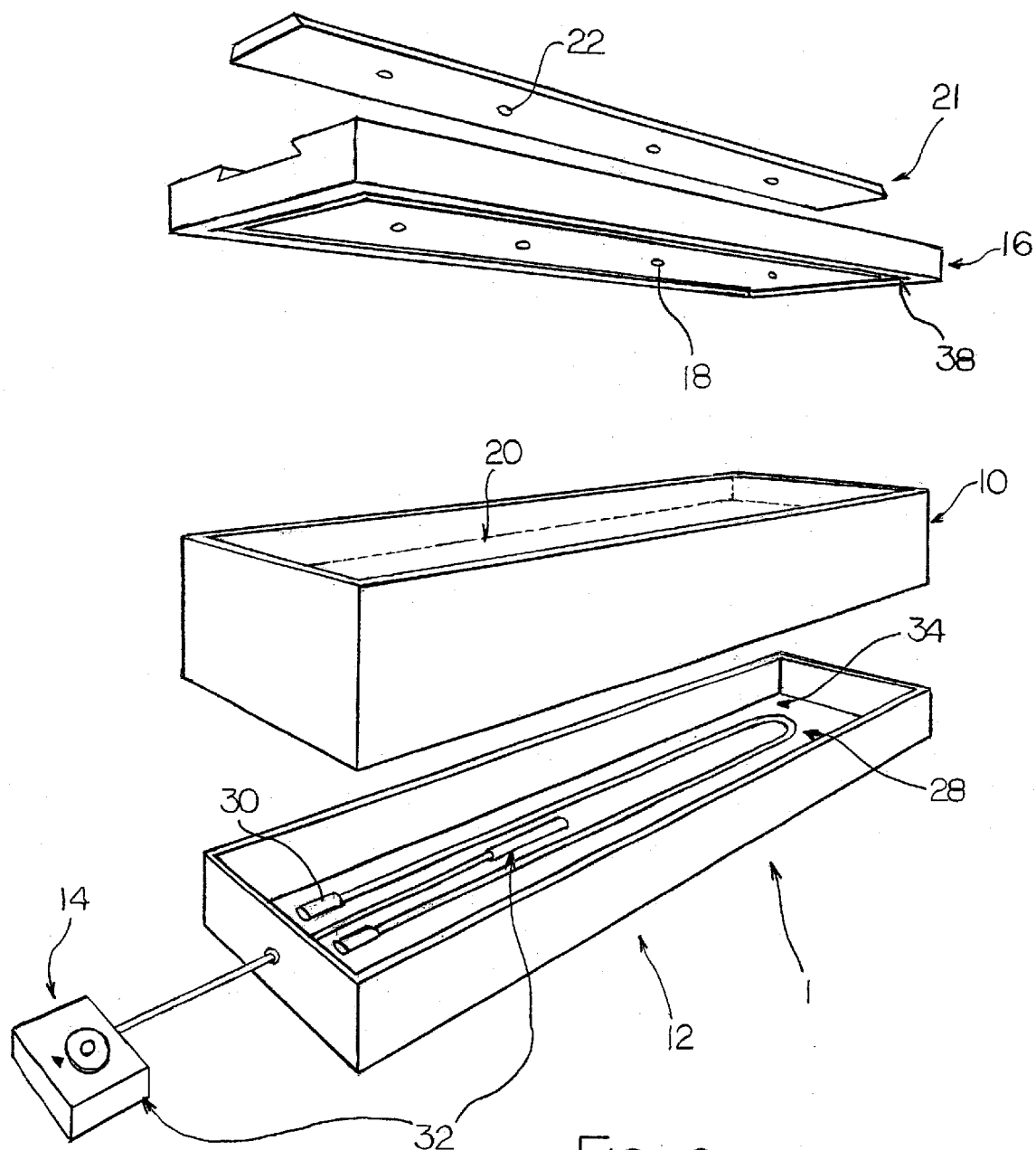
FIG. 2 is an exploded view of another embodiment of the evaporator.

A further embodiment of the evaporator 1 is shown in FIG. 2 wherein parts of the evaporator 1 have been separated for identification. In this embodiment, the heat source 12 comprises a "U" shaped heating element 28 which has two electrical connections 30. In this embodiment, the control unit 14 for controlling current to the heating element 28 is a mechanical thermostat 32. A thin pad of insulating material 34 is placed below the heating element 28 to prevent heat loss from the bottom of the unit. Formic acid is introduced into the absorbent material 20 which takes up approximately half the volume of the evaporation chamber 10. As the evaporation chamber 10 is heated, formic acid vapor is expelled through adjustable metering holes 18, as discussed above. Specifically, the size of the metering holes 18 is adjusted by moving the slide 21 to open or close the holes 18. The top 16 further includes a groove 38 which fits on the edge of the evaporation chamber 10 for providing a tight seal, as shown in FIG. 2.

In use, formic acid is placed in the evaporation chamber 10 of the evaporator 1 and the top 16 is fitted onto the evaporation chamber 10. The evaporator 1 is then placed in the hive and the slide 21 is positioned such that the desired amount of vapor will exit from the metering holes 18 when the evaporator 1 is in use. The control unit 14 is then used to set the temperature for the heat source 12. As the heat source 12 heats the formic acid, vapor forms which exits the evaporation chamber 10 via the metering holes 18 and is released into the hive. During the first 24 hours of treatment with formic acid, with this invention, extensive tests show that 90% of the varroa mites, which fall onto the observation material placed below the colony, are dead, and the remaining 10% die within the next 24 hours. On subsequent days of treatment, 99% of the varroa mites falling onto the observation material are dead. Any varroa mites (in all stages of development), which are hidden underneath the cappings with developing honey bee larvae, are also destroyed. These mites are subsequently removed by the worker bees after the fully developed bee emerges from its' cell. Extensive tests have demonstrated that any tracheal mites living within the trachea of the bees which are treated using the evaporator 1 die within the first 24 hours of treatment with formic acid.

As can be seen, because of the heat source 12, the amount of vaporised material produced by this invention is not significantly affected by the normal atmospheric temperature variations which can adversely affect other systems and applicators which depend primarily upon ambient conditions for their operation. Because of the added heat given off by the evaporator 1, formic acid vapor can be applied at temperatures as low as −10° C. This in turn improves effectiveness of treatment at low temperatures as honey bees cluster when the temperature falls below +5° C. but treatment with formic acid, for mite control, is most effective only when the bees are not clustered but freely moving about on the surfaces of the comb. Thus, the additional heating of the hive by the heat source 12 provides fully controlled evaporation for treatment administered even when the bees would normally be clustered.

Thus, the evaporator 1 allows the operator to regulate the amount of vaporised material introduced into a bee hive by incrementally controlling the evaporator temperature and metering aperture size. As discussed herein, continuous, optimum, flow of formic acid vapour kills parasitic mites much more effectively than other methods and systems, now in use, which administer peak amounts primarily during daylight hours when there is adequate solar heating and only minimal amounts when there is little or no solar heating. During treatment for varroa and tracheal mites, the consistent rate of evaporation achieved with the evaporator 1 can safely introduce a larger, more effective, volume of formic acid vapour into a bee hive in a 24 hour period, without damaging the bees. By providing a continuous, optimum, flow of formic acid vapour for 2 to 4 days, it has been demonstrated during extensive tests that virtually no mites are left alive within the treated colony. Thus, the evaporator 1 makes more efficient use of materials than other previously developed methods and systems by significantly decreasing the amount of formic acid required to destroy varroa mites and tracheal mites. With this invention, varroa and tracheal mites are destroyed with a shorter application time of formic acid. Furthermore, significantly less bee mortality occurs because treatment time is much reduced.

While the preferred embodiments of the invention have been described above, it will be recognized and understood that various modifications may be made therein, and the appended claims are intended to cover all such modifications which may fall within the spirit and scope of the invention.

What is claimed is:

1. A method of treating honey bee diseases comprising:
   providing a substantially air-tight reservoir containing a volatile material, said reservoir having at least one metered opening therein;
   placing the reservoir in contact with a bee hive; and
   heating the volatile material in the reservoir such that a vapor is produced from the volatile material, said vapor exiting the reservoir and entering the bee hive via said metered opening, said vapor having miticidal properties.

2. The method according to claim 1 wherein the volatile material is formic acid.

3. The method according to claim 1 wherein the reservoir includes a heater for heating the volatile material.

4. The method according to claim 3 wherein the heater includes a control unit for regulating the heater.

5. The method according to claim 1 wherein the reservoir is placed in a bee hive.

6. A device comprising:
   a substantially air-tight reservoir for storing a quantity of a volatile material, said reservoir having at least one metered opening;
   a heater for heating the volatile material; and
   a control unit for regulating the heater.

7. The device according to claim 6 wherein the volatile material is formic acid.

8. A method of treating honey bee diseases comprising:
   providing a substantially air-tight reservoir containing a volatile material, said reservoir having at least one opening therein;
   placing the reservoir in contact with a bee hive; and
   heating the reservoir directly such that a vapor is produced from the volatile material, said vapor exiting the reservoir and entering the bee hive via said opening, said vapor having miticidal properties.

9. The method according to claim 8 wherein the opening is metered for controlling the amount of vapor entering the hive.

10. The method according to claim 8 wherein the volatile material is formic acid.

11. The method according to claim 8 wherein the reservoir includes a heater for heating the volatile material.

12. The method according to claim 11 wherein the heater includes a control unit for regulating the heater.

13. The method according to claim 8 wherein the reservoir is placed in a bee hive.

14. A device comprising:
    a bee hive;
    a reservoir connected to the bee hive, said reservoir for storing a quantity of a volatile material, said reservoir having at least one opening for exit of vapor from the volatile material into the bee hive;
    a heater for heating the reservoir directly; and
    a control unit for regulating the heater.

15. The device according to claim 14 wherein the reservoir is substantially air-tight.

16. The device according to claim 15 wherein the opening is metered.

17. The device according to claim 14 wherein the volatile material is formic acid.

* * * * *